United States Patent
Kemp et al.

(10) Patent No.: US 9,869,981 B2
(45) Date of Patent: Jan. 16, 2018

(54) CONTROL DEVICE DIAGNOSTIC USING ACCELEROMETER

(71) Applicant: FISHER CONTROLS INTERNATIONAL LLC, Marshalltown, IA (US)

(72) Inventors: Matthew J. Kemp, Marshalltown, IA (US); Davin S. Nicholas, Marshalltown, IA (US); Mitchell S. Panther, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 577 days.

(21) Appl. No.: 14/456,786

(22) Filed: Aug. 11, 2014

(65) Prior Publication Data

US 2016/0041539 A1    Feb. 11, 2016

(51) Int. Cl.
*G05B 9/02* (2006.01)
*G05B 15/02* (2006.01)
(Continued)

(52) U.S. Cl.
CPC .......... *G05B 15/02* (2013.01); *F16K 37/0075* (2013.01); *G05B 19/042* (2013.01);
(Continued)

(58) Field of Classification Search
CPC .. G05B 19/44; G05B 19/0425; G05B 19/428; G05B 19/4185; G05B 15/02; H04Q 9/00;
(Continued)

(56) References Cited

U.S. PATENT DOCUMENTS

| 5,970,430 A * | 10/1999 | Burns | G05B 19/0425 700/117 |
| 2003/0236579 A1* | 12/2003 | Hauhia | G05B 19/0428 700/79 |

(Continued)

OTHER PUBLICATIONS

Israel Randomsky "The Need for Wireless Monitoring"—Eltav Wireless Monitoring LTD, Nov. 2009, pp. 1-5 <Radomsky_Eltay.pdf>.*

(Continued)

*Primary Examiner* — Tuan Vu
(74) *Attorney, Agent, or Firm* — Marshall, Gerstein & Borun LLP

(57) ABSTRACT

A diagnostic device is physically coupled to a control device in a process control system, and includes an accelerometer that determines when a motion or vibration of the control device is greater than a predetermined threshold. When this condition is detected, one or more other components of the diagnostic device (e.g., processor, communication module, etc.) are activated, and a distress signal is transmitted from the diagnostic device using the activated components. Consequently, the duty cycles of components of the diagnostic device are decreased and optimized, leading to significant power savings. Indeed, in some embodiments, energy harvesting may be sufficient to power the diagnostic device. Further, in some embodiments, the diagnostic device may not require a component processor.

21 Claims, 4 Drawing Sheets

(51) Int. Cl.
*F16K 37/00* (2006.01)
*G08C 19/02* (2006.01)
*H04Q 9/00* (2006.01)
*G05B 19/042* (2006.01)

(52) U.S. Cl.
CPC ............... G08C 19/02 (2013.01); H04Q 9/00 (2013.01); *G05B 2219/24015* (2013.01); *G05B 2219/25279* (2013.01); *G05B 2219/25288* (2013.01); *G05B 2219/25291* (2013.01); *G05B 2219/25312* (2013.01); *G05B 2219/37432* (2013.01); *G05B 2219/45006* (2013.01); *H04Q 2209/43* (2013.01); *H04Q 2209/823* (2013.01); *H04Q 2209/86* (2013.01); *H04Q 2209/883* (2013.01); *H04Q 2209/886* (2013.01)

(58) Field of Classification Search
CPC ............ H04Q 2209/823; F16K 37/083; F16K 37/091; G06Q 10/0633
See application file for complete search history.

(56) References Cited

U.S. PATENT DOCUMENTS

| | | | |
|---|---|---|---|
| 2005/0289276 A1* | 12/2005 | Karschnia | G05B 19/4185 710/305 |
| 2006/0174707 A1 | 8/2006 | Zhang | |
| 2009/0222220 A1* | 9/2009 | Wilke | F16K 37/0091 702/34 |
| 2010/0256784 A1* | 10/2010 | Seberger | G05B 19/44 700/33 |
| 2012/0319866 A1* | 12/2012 | Svoen | H04Q 9/00 340/870.39 |
| 2013/0019683 A1 | 1/2013 | Carder et al. | |
| 2013/0218482 A1 | 8/2013 | Chou et al. | |
| 2014/0005960 A1 | 1/2014 | Anderson et al. | |
| 2014/0144530 A1 | 5/2014 | Miller | |
| 2015/0285397 A1* | 10/2015 | Prescott | F16K 37/0083 137/553 |
| 2015/0347935 A1* | 12/2015 | Standing | G06Q 10/0633 705/7.27 |

OTHER PUBLICATIONS

International Search Report and Written Opinion, corresponding International Application No. PCT/US2015/044412, dated Oct. 23, 2015.
U.S. Appl. No. 13/858,986, filed Apr. 9, 2013.
U.S. Appl. No. 14/307,216, filed Jun. 17, 2014.
International Preliminary Report on Patentability and Written Opinion, corresponding International Application No. PCT/US2015/044412, dated Feb. 23, 2017.

* cited by examiner

CONTROL DEVICE DIAGNOSTIC USING ACCELEROMETER

FIELD OF THE INVENTION

The present disclosure relates generally to process control devices such as valves and, more particularly, to methods, systems, and apparatuses to diagnose the extraneous or excess movement of a process control device in a process control system.

BACKGROUND

Electronic controller devices (e.g., an electro-pneumatic controller, programmable controllers, analog control circuits, etc.) are typically used to control process control devices (also referred to interchangeably herein as "control devices" or "field devices," e.g., control valves, pumps, dampers, etc.). These electronic controller devices cause a specified operation of the process control devices. For purposes of safety, cost efficiency, and reliability, many well-known diaphragm-type or piston-type pneumatic actuators are used to actuate process control devices and are typically coupled to the overall process control system via an electro-pneumatic controller. Electro-pneumatic controllers are usually configured to receive one or more control signals and convert those control signals into a pressure provided to a pneumatic actuator to cause a desired operation of the process control device coupled to the pneumatic actuator. For example, if a process control routine requires a pneumatically-actuated valve to pass a greater volume of a process fluid, the magnitude of the control signal applied to an electro-pneumatic controller associated with the valve may be increased (e.g., from 10 milliamps (mA) to 15 mA in a case where the electro-pneumatic controller is configured to receive a 4-20 mA control signal).

Electro-pneumatic controllers typically use a feedback signal generated by a feedback sensing system or element (e.g., a position transducer or a position sensor) that senses or detects an operational response of a pneumatically-actuated control device. For example, a position sensor coupled to the control device may measure the movement of an actuator of the control device, and may provide, over a wired or wireless connection, feedback indicative of the position or state of the control device to a controller of the control device.

The health and operability of process control devices, and ultimately the performance of the process system, may be adversely affected by various factors. For a control device such as a control valve assembly, for example, flow and/or component looseness may occur due to the valve moving or vibrating. Thus, to monitor the health and/or remaining service life of the control valve assembly and/or one or more components of the control valve assembly, a diagnostic device may be coupled to the control device. The diagnostic device may monitor the subject control device for movement and/or vibration, and upon detection of extraneous or excess movement or vibration, the diagnostic device may generate a warning or distress signal, which may be transmitted to the controller of the device, for example.

Known diagnostic devices typically include an accelerometer to detect the movement and/or vibration of the subject control device, and a processor that periodically or constantly queries the accelerometer to obtain current motion and/or vibration readings. As such, known diagnostic devices must continually expend energy to power the processor so that the processor may make its queries even when the motion and or vibration of the control device is within acceptable limits. Further, known diagnostic devices typically must continually expend energy to power other components as well.

SUMMARY

In accordance with a first exemplary aspect, a device for diagnosing a control device that is used in a process control system may include an accelerometer responsive to a motion of the control device. The accelerometer may be configured to generate a signal when a magnitude of the motion of the control device is greater than a threshold, where the signal is to activate one or more components of the diagnostic device. For instance, the diagnostic device may include a communication module that is configured to activate based on the signal generated by the accelerometer. Additionally, the communication module may be configured to transmit, after activation, a signal indicative of the magnitude of the motion of the control device being greater than the threshold.

In accordance with a second exemplary aspect, a method of diagnosing a control device that is used in a process control system may include determining, by a diagnostic device coupled to the control device, a magnitude of a motion of the control device. The control device may be, for example, a process control device such as a valve, a pump, a damper, etc., and the determination of the magnitude of the motion of the control device may be performed by an accelerometer included in the diagnostic device. The method may include causing a communication module of the diagnostic device to activate when the magnitude of the motion of the control device is greater than a threshold value, and causing, using the activated communication module, a wireless signal to be wirelessly transmitted from the diagnostic device, where the signal is indicative of the magnitude of the motion of the control device being greater than the threshold value.

In accordance with any one or more of the foregoing first or second aspects, a device and/or a method for diagnosing a process control device (e.g., a diagnostic device for a process control device) may further include any one or more of the following preferred forms.

In one preferred form, the diagnostic device may include a connector that physically couples the diagnostic device to the control device. For example, the connector may couple the diagnostic device to a stem or an actuator of the control device.

In another preferred form, the communication module may be in a powered-off state, a sleep state, or another energy-conserving state prior to activation.

In another preferred form, the diagnostic device may include a processor that is communicatively disposed between the accelerometer and the communication module. The processor may be configured to receive the signal generated by the accelerometer when the magnitude of the control device motion is greater than the threshold or the threshold value, and cause the communication module to activate based on the reception of the signal generated by the accelerometer.

In yet another preferred form, the accelerometer and the communication module may be in direct communication, or may have a direct communicative connection. For example, the diagnostic device may exclude any processor that is communicatively disposed between the accelerometer and the communication module.

In another preferred form, the diagnostic device may include an energy harvester, and the communication module may activate by using energy harvested by the energy harvester.

In a further preferred form, the diagnostic device may include an energy storage device, and the communication module may activate by using energy stored in the energy storage device. In some configurations, the energy storage device may store energy harvested by the energy harvester.

In a further preferred form, the signal transmitted by the communication module of the diagnostic device may conform to a WirelessHART® protocol, a Zigbee® protocol, or a short-range wireless protocol.

In another preferred form, the control device may be a valve.

In another preferred form, the threshold or the threshold value may be modifiable or configurable.

In still another preferred form, the motion of the control device may be a vibration of the control device.

In a preferred method, determining the magnitude of the motion of the control device may include determining the magnitude of a vibration of the control device.

In another preferred method, causing the communication module of the diagnostic device to activate may include causing the communication module of the diagnostic device to activate based on a signal generated by the accelerometer when the magnitude of the motion of the control device is greater than the threshold or the threshold value.

In yet another preferred method, causing the communication module of the diagnostic device to activate may include causing the communication module to activate from a powered-off state, a sleep state, or another energy-conserving state.

In a further preferred method, causing the wireless signal to be transmitted from the diagnostic device may include causing the wireless signal to be transmitted from the diagnostic device to at least one of: a controller of the control device; a control system host of the process control system; or a device paired with the diagnostic device, wherein the paired device is at least one of (1) communicatively disposed between the diagnostic device and the controller, or (2) communicatively disposed between the diagnostic device and the control system host.

In another preferred method, causing the signal to be transmitted from the diagnostic device may include causing the signal to be transmitted from the diagnostic device by using the WirelessHART protocol, a Zigbee protocol, or a short-range wireless protocol.

In another preferred method, the method may further include powering the communication module using energy stored in an energy storage device included in or proximate to the diagnostic device.

In yet another preferred method, the method may include recharging the energy storage device by using at least one of: solar energy, a temporary connection of the energy storage device to an energy source, recovered energy from a local vibration or movement, or induction from a proximity charger.

In a further preferred method, determining the magnitude of the motion of the control device may include determining the magnitude of the motion of a valve.

In another preferred method, the threshold or threshold value may be stored in the accelerometer of the diagnostic device, and the method may further include modifying the threshold or the threshold value stored in the accelerometer of the diagnostic device.

DETAILED DESCRIPTION

Although the following describes example methods and apparatus including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example methods and apparatus, the examples provided are not the only way to implement such methods and apparatus.

Typically, in a process control system, a controller (e.g., an electro-pneumatic controller) is directly coupled to a process control device (also referred to interchangeably herein as "control devices" or "field devices," e.g., control valves, pumps, dampers, etc.). A position sensor coupled to the control device may measure the movement of the control device or of an actuator coupled to the control device, and may provide, over a wired or wireless connection, feedback indicative of the position or state of the control device to a controller of the control device. Additionally, a diagnostic device may be coupled to the control device, and the diagnostic device may detect extraneous or excess movement or vibration of the control device and generate a warning or distress signal upon detection of such adverse conditions. The diagnostic device may be a low-power diagnostic device, for example.

The disclosed methods, systems, and apparatuses having diagnostic devices (and in particular, having low-power diagnostic devices) are described below in conjunction with illustrative examples involving an electro-pneumatic digital valve controller and a pneumatically actuated valve. However, it is understood that these examples are not limiting. In fact, the disclosed methods and apparatus may be implemented with other types of controllers, with valves actuated in other manners, and/or with process control devices other than valves.

Figure 1:
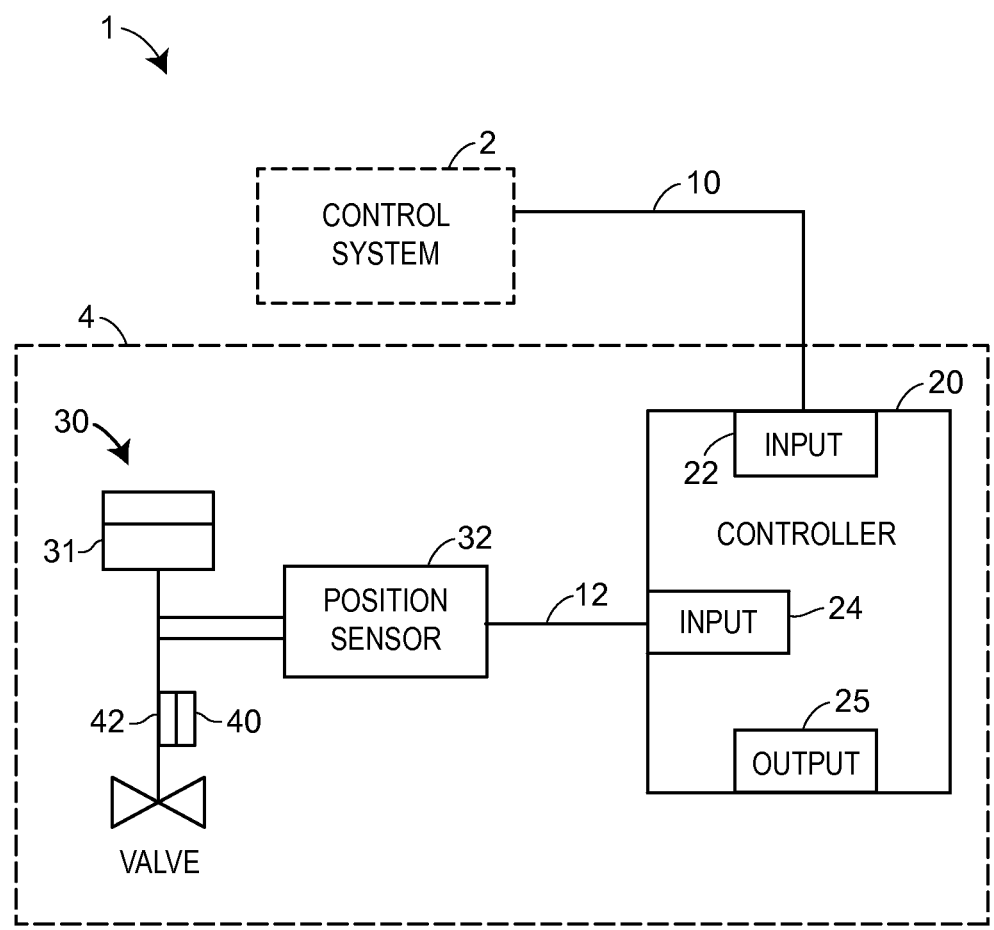
FIG. 1 is a block diagram of an example process control system including an example diagnostic device to diagnose a process control device of the process control system.

FIG. 1 is a block diagram of an example process control system 1 including a control system 2 and a process control area 4. The process control system 1 may be included in a process plant, such as a petroleum, chemical and/or other type of industrial process plant, and the process control system 1 may control one or more processes executed by the process plant. The control system 2 may include workstations, controllers, marshalling cabinets, input/output cards, and/or any other type of process control system management components (not shown in FIG. 1).

In some process plants, the control system 2 is located in a different area than the process control area 4 such as an enclosed room, e.g., to shield the control system 2 from noise, dust, heat, and other undesired environmental conditions. The control system 2 may be in communicative connection with a controller 20, e.g., an electro-pneumatic controller, located in the process control area 4. The control system 2 may power the controller 20, or the controller 20 may be powered by a local energy source, such as an external voltage source, solar power, battery power, a capacitor, etc.

The controller 20 may include a communication interface or input 22 via which signals from the control system 2 and/or to the control system 2 may be received and sent over one or more communication channels 10. The one or more communication channels 10 may include a wired communication channel, a wireless communications channel, or both a wired and a wireless communication channel. Accordingly, the interface 22 may be a wired interface, a wireless interface, or both a wired and a wireless interface. The interface 22 may be configured to communicate with a control host, other controllers, and/or other elements included in the control system 2. In an embodiment, the interface 22 is configured to communicate with other controllers and/or elements included in the process control area 4.

In an embodiment, the interface 22 may receive, from the control system 2, control signals over the channel(s) 10 that specify or correspond to a desired valve state for a valve or control device 30 that is located in the process control area 4. For example, the control signals received by the electro-pneumatic controller 20 using the interface 22 may cause a pneumatic actuator 31 coupled to the valve 30 to be opened, closed, or moved to some intermediate position.

It is noted that while the electro-pneumatic controller 20 and the process control device 30 are shown in FIG. 1 as being located within the process control area 4, in some configurations, each of the electro-pneumatic controller 20 and the process control device 30may be located in a respective different operating environment and communicatively coupled together via one or more wired and/or wireless communication channels, such as via wireless communication channels included in a wireless communication network of the process plant or control environment 1. For example, the process control device 30 may be located within a relatively high temperature and high humidity environment (e.g., 90% humidity and 180 degrees Fahrenheit (° F.) while the electro-pneumatic controller 20 is located in a controlled environment set to 10% humidity and 72° F.

At any rate, the control signals (e.g., input signals) received at the interface 22 may include, for example, a 4-20 mA signal, a 0-10 Volt Direct Current (VDC) signal, a wireless signal, and/or digital commands, etc. For example, in a case where the control signal is a 4-20 mA signal, a digital data communication protocol such as, for example, the well-known Highway Addressable Remote Transducer (HART®) protocol may be used to communicate over a wired connection 10 with the electro-pneumatic controller 20. In another example, the control signal may be a wireless control signal received over a wireless communication channel 10 using the WirelessHART protocol. In other examples, the control signal may be a 0-10 VDC signal, or other type of signal. Such digital communications may be used by the control system 2 to retrieve identification information, operation status information and diagnostic information from the electro-pneumatic controller 20. Additionally or alternatively, such digital communications may be used by the control system 2 to effect control of the valve 30 through its respective controller 20.

The example electro-pneumatic controller 20 of FIG. 1 may control the position of the actuator 31 and, thus, the position of the valve 30. The electro-pneumatic controller 20 may include, although not shown, a control unit, a current-to-pneumatic (I/P) converter, and a pneumatic relay. In other examples, the electro-pneumatic controller 20 may include any other components for controlling and/or providing pressure to the valve actuator 31. Additionally, the electro-pneumatic controller 20 may include other signal processing components such as, for example, analog-to-digital converters, filters (e.g., low-pass filters, high-pass filters, and digital filters), amplifiers, etc. For example, the control signal received from the control system 2 may be filtered (e.g., using a low/high pass filter) prior to being processed by a control unit within the electro-pneumatic controller 20.

More specifically, the electro-pneumatic controller 20 may control the position of the actuator 31 by comparing a feedback or position signal indicative of a position of the valve, where the signal is received via a wired or wireless communication channel 12. For example, in the case of a pneumatically-actuated valve, the feedback signal may be a feedback current signal corresponding to the position of the valve as measured or determined by a position sensor 32. In some configurations, the feedback current signal corresponding to the position of the valve may transmitted to the controller via the wired or wireless connection 12, and the position of the valve 30 may be calculated by the controller 20, e.g., based on a voltage differential across a resistor at two inputs of the controller.

In some configurations, the feedback or position signal generated by the position sensor 32 may include therein an indication of the position of the valve. That is, the indication of the position of the valve may be generated by the position sensor 32, in a manner such as described in U.S. patent application Ser. No. 14/086,102, entitled "Wireless Position Transducer for a Valve" and filed on Nov. 21, 2013, the entire disclosure of which is hereby incorporated by reference herein. For example, the feedback or position sensor 32 may be a wireless position transducer or sensor that generates a wireless feedback signal in accordance with a Zigbee, Bluetooth, Wi-Fi, ultra-wideband (UWB), infrared (IR), some other suitable short-range wireless protocol, or a near field wireless communications (NFC) protocol. In some embodiments, the wireless position feedback signal may be in accordance with the WirelessHART protocol. At any rate, the feedback signal may include data or a value indicative of the current position of the valve 31, and the feedback signal may be transmitted from the sensor 32 to the controller 20 over one or more wireless communications channels 12. In some configurations, the feedback signal 12 generated by a position sensor 32 and including therein the indication of the position of the valve 30 may be transmitted to the controller 20 over a wired communication channel 12.

The position feedback signal generated by the position transducer or sensor 32 may be received by the electro-pneumatic controller 20 at a second communication interface or input 24, coupled to the channel(s) 12. The interface 24 may include a wireless transceiver, a wireless receiver, or a wired interface. The electro-pneumatic controller 20 may determine the feedback signal based on the feedback or position signal received from the position transducer 32 via the second interface 24. In an embodiment, the first interface 22 and the second interface 24 may be integrated into a single interface.

The electro-pneumatic controller 20 may further include a control unit or processor (not shown) coupled to a memory (also not shown), to the inputs 22 and 24, and to the output 25. The controller memory may be a tangible, non-transitory memory, and may include one or more computer-readable storage media. For example, the controller memory may be implemented as one or more semiconductor memories, magnetically readable memories, optically readable memories, and/or any other suitable tangible, non-transitory computer-readable storage media. The controller memory may store thereon computer-executable instructions that are executable by the controller processor to determine, based on the received position signal from the second interface 24 and the received control signal from the first interface 22, a value of a drive signal to be transmitted via the output 25 to control the valve 30. For example, the computer-executable instructions to determine the drive signal comprise a position control algorithm or process that is downloaded during configuration and/or during real-time from the control system 2.

In particular, the control signal provided by the control system 2 may be used by the electro-pneumatic controller 20 as a set-point or reference signal corresponding to a desired operation (e.g., a desired position corresponding to a percentage of a control valve 30 operating span) of the valve 30. The control unit (not shown) within the electro-pneumatic controller 20 may compare the position feedback signal to the control signal 10 by using the control signal 10 and the feedback signal as values in a position control algorithm or process to determine a drive value. The position control process performed by the control unit may determine (e.g., calculates) the drive value based on the difference between the feedback signal and the control signal 10. This calculated difference corresponds to an amount the electro-pneumatic controller 20 is to change the position of the actuator 31 coupled to the valve 30, in an embodiment. The calculated drive value also corresponds to a current generated by the control unit to cause an I/P converter within the electro-pneumatic controller 20 to generate a pneumatic pressure, in an embodiment. The electro-pneumatic controller 20 outputs the drive signal via an output 25 to control the valve 30, for example.

In an embodiment, the I/P converter within the electro-pneumatic controller 20 is included in the output 25. The I/P converter may be a current-to-pressure type transducer that generates a magnetic field based on the current applied through the solenoid. The solenoid may magnetically control a flapper that operates relative to a nozzle to vary a flow restriction through the nozzle/flapper to provide a pneumatic pressure that varies based on the average current through the solenoid. This pneumatic pressure may be amplified by a pneumatic relay and applied to the actuator 31 coupled to the valve 30. The pneumatic relay within the electro-pneumatic controller 20 may be pneumatically coupled to the actuator 31 to provide the actuator 31 with a pneumatic pressure (not shown).

For example, a drive value that increases the current generated by the control unit within the electro-pneumatic controller 20 may cause the pneumatic relay to increase a pneumatic pressure applied to the pneumatic actuator 31 to cause the actuator 31 to position the valve 30 towards a closed position. Similarly, drive values that decrease the current generated by the control unit may cause the pneumatic relay to decrease the pneumatic pressure applied to the pneumatic actuator 31 to cause the actuator 31 to position the valve 30 towards an open position.

In other examples, the output 25 of the electro-pneumatic controller 20 may include a voltage-to-pressure type of transducer, in which case the drive signal is a voltage that varies to provide a varying pressure output to control the valve 30. Additionally, other examples of outputs may implement other types of pressurized fluid including pressurized air, hydraulic fluid, etc.

Turning to the example valve 30 of FIG. 1, the valve 30 may include a valve seat defining an orifice that provides a fluid flow passageway between an inlet and an outlet, in an embodiment. The valve 30 may be, for example, a rotary valve, a quarter-turn valve, a motor-operated valve, a damper, or any other control device or apparatus. The pneumatic actuator 31 coupled to the valve 30 may be operatively coupled to a flow control member via a valve stem, which moves the flow control member in a first direction (e.g., away from the valve seat) to allow fluid flow between the inlet and the outlet and in a second direction (e.g., toward the valve seat) to restrict or prevent fluid flow between the inlet and the outlet. The actuator 31 coupled to the example valve 30 may include a double-acting piston actuator, a single-acting spring return diaphragm or piston actuator, or any other suitable actuator or process control device. To control the flow rate through the valve 30, the valve 30 may be coupled to the position transducer or sensor 32.

Additionally, as shown in FIG. 1, a device 40 for diagnosing the valve 30 (e.g., a diagnostic device 40) may be physically coupled to the valve 30. For example, a connector or coupling mechanism 42 may physically connect or attach the diagnostic device 40 to the stem or actuator of the valve 30. The connector or coupling mechanism 42 may be partially or entirely included in the diagnostic device 40, or the connector 42 may be a component that is separate from the diagnostic device 40.

Figure 2:
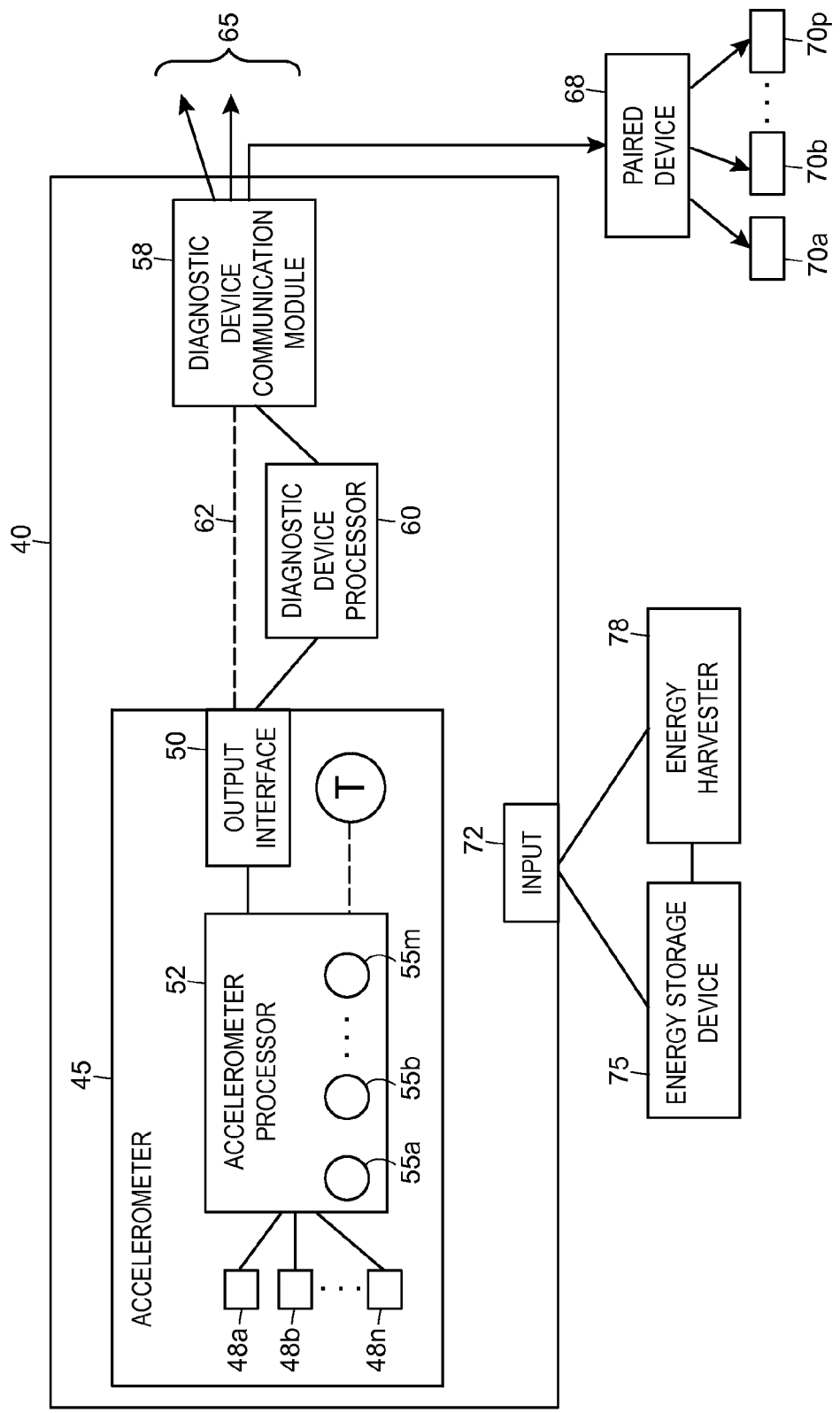
FIG. 2 is a detailed block diagram of the example diagnostic device of FIG. 1.

A detailed block diagram of the diagnostic device 40 is depicted in FIG. 2. As shown in FIG. 2, the diagnostic device 40 may include an accelerometer 45 that is responsive to the motion of the valve 30, e.g., to the motion of the stem or actuator to which the diagnostic device 40 is attached. For example, the accelerometer 45 may be a micro electro-mechanical systems (MEMS)-based accelerometer, such as a MEMS multi-axis accelerometer (e.g., MEMS 3-axis sensor, or other suitable multi-axis accelerometer) that is responsive to multi-axial motion or vibration of the valve 30 (or of parts of the valve 30).

In the embodiment shown in FIG. 2, the accelerometer 45 of the diagnostic device 40 may be a smart, low-power accelerometer including one or more transducers 48a-48n corresponding to one or more spatial axes (e.g., X-axis, Y-axis, and Z-axis transducers), an output communication interface 50 for transmitting an output signal from the accelerometer 45, and a processor 52, which may be a digital signal processor or other suitable processor. The accelerometer processor 52 may include (e.g., may store and execute) one or more embedded functions, routines, programs, or instructions 55a-55m, at least some of which may be configurable by a user. In the diagnostic device 40 of FIG. 2, at least one of said functions 55a-55m may be configurable or programmable to sense or detect a magnitude of a current motion or vibration of the valve 30 (or of the part of the valve 30 to which the diagnostic device 40 is attached) based on the output of the transducers 48a-48n, and to determine when the magnitude of the detected motion or vibration is greater than a given or predetermined threshold or threshold value T. The threshold T may be stored, for example, integrally in the accelerometer 45 (e.g., in the accelerometer processor 52, or in some other memory of the accelerometer 45, as illustrated in FIG. 2), or the threshold T may be stored in another memory of the diagnostic device 40 that is accessible to the accelerometer processor 52 (not shown).

The threshold T may be configurable and modifiable, e.g., by a user of the diagnostic device 40. For example, the threshold T may be configured to different values for different types of subject control devices 30, and/or for different operating conditions.

When the accelerometer 45 determines that the magnitude of the motion or vibration of the valve 30 is greater than the threshold T, the accelerometer 45 may cause an activation of a communication module 58 included in the diagnostic device 40. The communication module 58 may be activated from a powered-off state, or the communication module 58 may be activated from a sleep state or other energy-conserving state. In some embodiments, the accelerometer 45 may cause activation of the communication module 58 by sending a first signal to a processor 60 that is included in the diagnostic device 40 and that is communicatively disposed between the accelerometer 45 and the communication module 58. Based on the reception of the first signal, the diagnostic device processor 60 may send a second signal to activate the communication module 58. In some configurations, the first signal sent from the accelerometer 45 to the diagnostic device processor 60 activates the diagnostic device processor 60 from a powered-off, sleep, or energy-conserving state, and upon activation, the diagnostic device processor 60 may send the second signal to activate the communication module 58.

In some embodiments of the diagnostic device 40, the processor 60 may be omitted or excluded. That is, the diagnostic device 40 may not include any component processor 60 at all. In these embodiments, the accelerometer 45 may cause the activation of the communication module 58 by directly sending signal to the communication module 58 as indicated by reference 62, that is, the accelerometer 45 and the communication module 58 may be in direct communication.

At any rate, upon receiving the signal to activate, the communication module 58 may wake or activate, and may cause one or more signals 65 to be transmitted from the diagnostic device 40 to one or more destination devices. Each signal 65 may be indicative of the magnitude of the detected motion or vibration of the valve 30 (or of the part of the valve 30 to which the diagnostic device 40 is attached) being greater than the threshold T, and thus is referred to interchangeably herein as a diagnostic signal, distress signal, output signal, or warning signal 65. Generally, the distress signal 65 may be indicative of extraneous or excess movement or vibration of the valve 30. In some cases, the distress signal 65 may include other information, such as a value that is indicative of the magnitude of motion or vibration, a time stamp, etc. The other information may be generated by the accelerometer processor 52, for example, and/or may be generated by the diagnostic device processor 60.

The communication module 58 may cause the one or more distress signal 65 to be transmitted from the device 40 over one or more wired or wireless communication interfaces. Examples of wireless communication interfaces over which a distress signal 65 may be transmitted from the diagnostic device 40 include wireless communication interfaces that support a Zigbee, Bluetooth, Wi-Fi, ultra-wideband (UWB), infrared (IR), WirelessHART, near field wireless communications (NFC), and/or other suitable short-range wireless protocol. Examples of wired communication interfaces over which a distress signal 65 may be transmitted from the diagnostic device 40 include wired communication interfaces that support a process control-specific communication protocol such as FOUNDATION® Fieldbus, PROFIBUS, DeviceNet, HART® (Highway Addressable Remote Transducer), etc., and/or a general-purpose communication protocol, such as Ethernet or IP (Internet Protocol).

Further, the distress signal 65 may be transmitted from the diagnostic device 40 to one or more other destination devices operating in or in conjunction with the process control environment or plant 1. For example, the distress signal 65 may be transmitted from the diagnostic device 40 to the controller 20, to another controller, to a control system host, to a data historian, to an analyzer, to a local or remote user interface, to an external computing device, etc. In some configurations, the distress signal 65 may be transmitted from the diagnostic device 40 to a paired device 68, which may in turn forward the distress signal 65 (or equivalent) to one or more other destination devices 70a-70p operating in or in conjunction with the process control environment or plant 1 (e.g., the controller 20, another controller, a control system host, a data historian, an analyzer, a local or remote user interface, an external computing device, etc.). For example, a paired device 68 may be utilized as a forwarding node to aid in maintaining the signal strength and integrity of signal transmissions. In some cases, a single paired device 68 may forward multiple different distress signals 65 (or equivalents) to one or more respective destination devices 70a-70p. The different distress signals 65 may have been generated by multiple different diagnostic devices 40 attached respectively to multiple different control devices 30, in some situations.

Additionally, the protocol via which the paired device 68 receives the distress signal 65 from the diagnostic device 40 and the protocol via which the paired device 68 forwards corresponding distress information may be the same wired or wireless protocol, or may be different wired and/or wireless protocols. In some embodiments, the paired device 68 may combine the information from multiple different distress signals 65 received from multiple different diagnostic devices 40 into a single output message or signal.

Returning to the diagnostic device 40, the diagnostic device 40 may include an input or connection 72 that receives power from a local power source or energy storage device 75 and/or from an energy harvester 78 to power one or more components of the diagnostic device 40. For example, the accelerometer 45, the processor 60, and/or the communication module 58 may receive power from the local power source or energy storage device 75. The local power source or energy storage device 75 may be included with the diagnostic device 40 as an integral unit, in some embodiments. In some embodiments, the local power source or energy storage device 75 is rechargeable. For example, the local power source or energy storage device 75 may be a battery, capacitor, or other rechargeable energy storage device, and any known technique for recharging the local power source or energy storage device 75 may be used to recharge the device 75, such as by capturing solar energy; replacing a battery; harvesting or recovering energy from local heat, vibration and/or movement; temporarily connecting to a plug-in source such as a AC power source; inductively recharging using a proximity charger; or other suitable recharging technique. In FIG. 1, the energy storage device 75 is depicted as being connected to an energy harvester 78 which harvests energy from the diagnostic device 40, the valve 30, and/or other proximate sources to recharge the energy storage device 75. For example, the energy harvester 78 may harvest energy from the motion of the valve 30 and/or other elements or portions of the diagnostic device 40 (e.g., from the accelerometer 45), and may store the harvested energy in the energy storage device 75. In some configurations, the energy harvester 78 may be included with the diagnostic device 40 as an integral unit.

Embodiments of the diagnostic device 40 provide numerous advantages over currently known diagnostic devices. As previously discussed, currently known diagnostic devices utilize much more power than the diagnostic device 40, as such known devices typically require a processor to periodically and/or continually ping or query an accelerometer or other sensor for motion/vibration readings of the subject control device, even when the magnitudes of motion/vibration are within an acceptable, non-distressed range. Indeed, for some known diagnostic devices, other components in addition to the processor are continually powered. On the other hand, the power needs or duty cycles of the diagnostic device 40 are greatly reduced as compared to currently known diagnostic devices, as the diagnostic device 40 (or parts thereof) activate, wake, or fully power-on only when magnitudes of motion and/or vibration of the subject process control device 30 are greater than a distress threshold T. Indeed, in some embodiments, merely harvesting the energy produced by the mechanical movement of the control device 30 (e.g., by the energy harvester 78) may provide sufficient power to the diagnostic device 40 for operation without requiring any additional energy storage. In these embodiments, the energy storage device 75 may be omitted, and the energy harvester 78 may directly power the accelerometer 45, the communication module 58, and/or other components of the diagnostic device 40 via the input or connection 72. Thus, in these embodiments, not only is power conserved, but the size, weight, and number of components of the diagnostic device 40 may be reduced from that required for currently known diagnostic devices.

Moreover, in some embodiments, the size, weight, and number of components of the diagnostic device 40 may be further reduced from that required for currently known devices by omitting the processor 60. For example, the accelerometer 45 may directly provide the distress signal 65 (or may directly provide the contents of the distress signal 65) to the communication module 58 (reference 62) to activate the communication module 58, and upon activation, the communication module 58 cause the distress signal 65 to be transmitted from the diagnostic device 40. In another example, the accelerometer 45 may simply trigger the communication module 58 when the magnitude of detected motion/vibration exceeds the distress threshold T, and upon reception of the trigger, the communication module 58 may transmit a distress signal 65 that has been programmed or hardcoded into the communication module 58 a priori.

Figure 3:
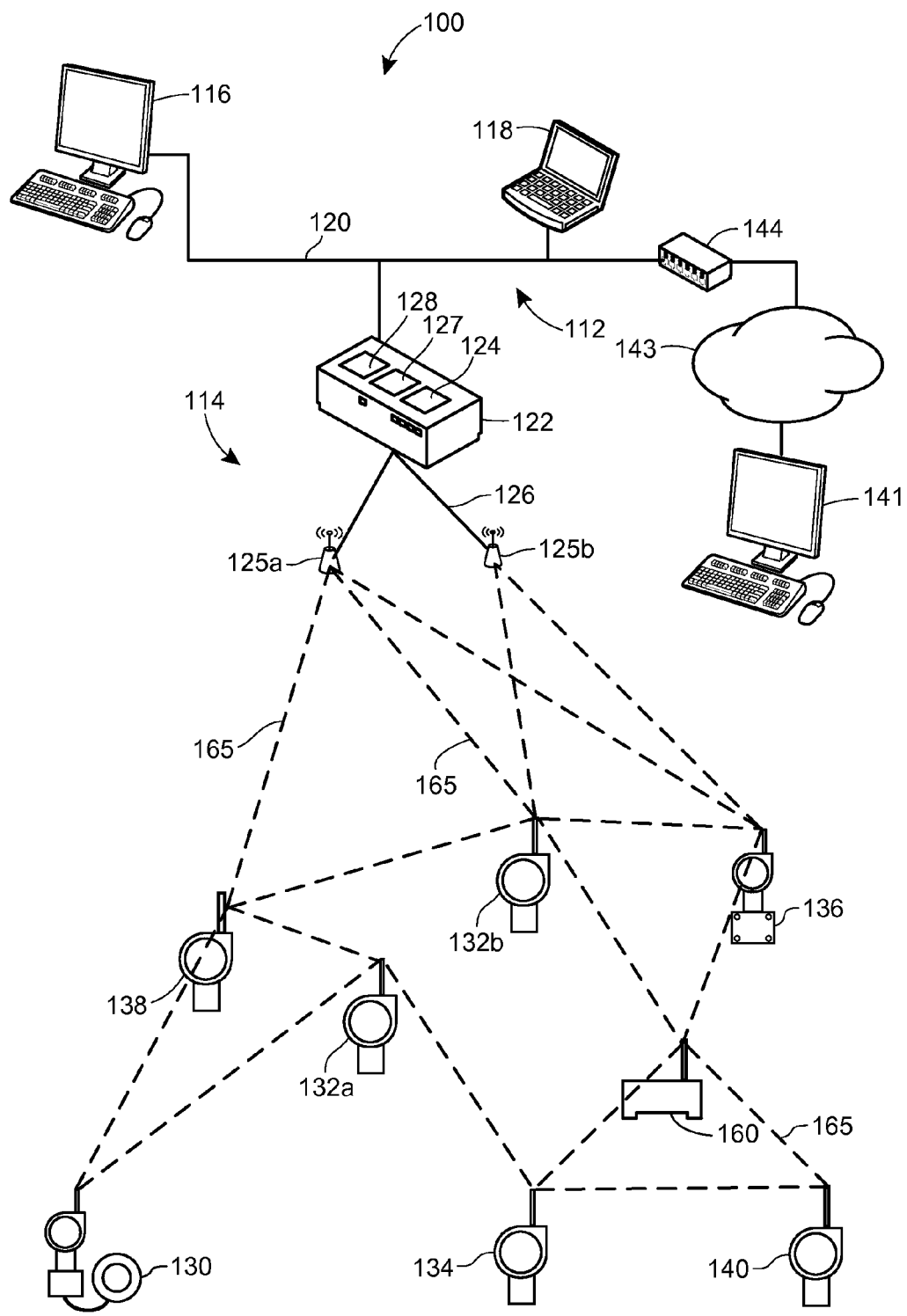
FIG. 3 is a block diagram that illustrates an example process control system utilizing a wireless communication network to provide wireless communication between process control devices, controllers, routers, and other network devices.

FIG. 3 illustrates an exemplary process control network 100 into which the diagnostic device 40 of FIG. 1 may be incorporated. In an embodiment, the process control network 100 is included in the control system 1 of FIG. 1. The network 100 may include a plant automation network 112 and a communications network 114. In FIG. 1, the communications network 114 is illustrated as a wireless mesh communications network. For example, the communications network 114 may support a wireless HART (Highway Addressable Remote Transducer) protocol, e.g., a "wireless HART network." In some embodiments of the network 100, however, the communications network 114 may support a wired HART protocol, e.g., a "wired HART network," or other wired, process control-specific communication protocol (e.g., FOUNDATION, Fieldbus, PROFIBUS, DeviceNet, HART, etc.). In some embodiments, both a wired and a wireless network 114 may be included in the network 100.

The plant automation network 112 may include one or more stationary workstations 116 and one or more portable workstations 118 connected over a communication backbone 120. The workstations 116, 118 are interchangeably referred to herein as "workstations," "control system hosts," "control hosts," or "hosts" of the process control network 100. The backbone 120 may be implemented over Ethernet, RS-485, Profibus DP or other suitable wired and/or wireless communication protocol.

The plant automation network 112 and the wireless HART network 114 may be connected via a gateway 122. In an embodiment, the gateway 122 may be connected to the backbone 120 in a wired manner and may communicate with the plant automation network 112 by using any suitable known protocol. The gateway 122 may be implemented as a standalone device, as a card insertable into an expansion slot of the hosts or workstations 116 or 118, or as part of the IO subsystem of a PLC-based or DCS-based system, or in any other manner. The gateway 122 may provide, to applications running on the network 112, access to various network devices of the wireless HART network 114. In addition to protocol and command conversion, the gateway 122 may provide synchronized clocking used by time slots and superframes (sets of communication time slots spaced equally in time) of the scheduling scheme of the wireless HART network 114.

In some situations, networks may have more than one gateway 122. These multiple gateways can be used to improve the effective throughput and reliability of the network by providing additional bandwidth for the communication between the wireless HART network and the plant automation network 112 or the outside world. On the other hand, the gateway 122 device may request bandwidth from the appropriate network service according to the gateway communication needs within the wireless HART network. The gateway 122 may further reassess the necessary bandwidth while the system is operational. For example, the gateway 122 may receive a request from a host residing outside the wireless HART network 114 to retrieve a large amount of data. The gateway device 122 may then request additional bandwidth from a dedicated service such as a network manager in order to accommodate this transaction. The gateway 122 may then request the release of the unnecessary bandwidth upon completion of the transaction.

In some embodiments, the gateway 122 is functionally divided into a virtual gateway 124 and one or more network access points 125a, 125b. Network access points 125a, 125b may be separate physical devices in wired communication with the gateway 122 in order to increase the bandwidth and the overall reliability of the wireless HART network 114. However, while FIG. 1 illustrates a wired connection 26 between the physically separate gateway 122 and access points 125a, 125b, it will be understood that the elements 122-126 may also be provided as an integral device. Because network access points 125a, 125b may be physically separate from the gateway device 122, each of the access points 125a, 125b may be strategically placed in several distinct locations. In addition to increasing the bandwidth, the multiple access points 125a, 125b can increase the overall reliability of the network by compensating for a potentially poor signal quality at one access point at one or more other access points. Having multiple access points 125a, 125b also provides redundancy in case of failure at one or more of the access points 125a, 125b.

The gateway device 122 may additionally contain a network manager software module 127 (e.g., "network manager") and a security manager software module 128 (e.g., "security manager"). In another embodiment, the network manager 127 and/or the security manager 128 may run on one of the process control hosts 116, 118 of the plant automation network 112. For example, the network manager 127 may run on the host 116 and the security manager 128 may run on the host 118. The network manager 127 may be responsible for configuration of the network 114; scheduling communications between devices included in the network 114 such as wireless HART devices (i.e., configuring superframes); determining a network communication schedule and cause at least portions thereof to be delivered to recipient devices and controllers; managing routing tables; and monitoring and reporting the health of the wireless HART network 114. While redundant network managers 27 are supported, it is contemplated that there should be only one active network manager 127 per wireless HART network 114. In one possible embodiment, the network manager 127 analyzes the information regarding the layout of the network, the capability and update rate of each network device, and other relevant information. The network manager 127 may then define routes and schedules of communications to, from and between network devices in view of these factors. In an embodiment, the network manager 127 may be included in one of the control hosts 116, 118.

Referring again to FIG. 3, the wireless HART network 114 may include one or more field devices or control devices 130-140. In general, process control systems, like those used in chemical, petroleum or other process plants, include such field devices as valves, valve positioners, switches, sensors (e.g., temperature, pressure and flow rate sensors), pumps, fans, etc. Field devices may perform process control functions within a process that is controlled by the process control network 100. A process control function may include, for example, opening or closing valves and/or monitoring or taking measurements of process parameters. In the wireless HART communication network 114, field devices 130-140 are producers and consumers of wireless HART packets.

An external host 141 may be connected to an external network 143 which, in turn, may be connected to the plant automation network 112 via a router 144. The external network 143 may be, for example, the World Wide Web (WWW). Although the external host 141 does not belong to either the plant automation network 112 or the wireless HART network 114, the external host 141 may access devices on both networks 112, 114 via the router 144. Accordingly, the communication network 114 and the plant automation network 112 of the process control system 100 may be private networks, so that access to the networks 112, 114 is secured. For example, devices wishing to connect to the network 112 and/or the network 114 may be required to be authorized. Similarly, the external host 141 may control secure network access for communications from the external network 143.

The wireless HART network 114 may use a protocol which provides similar operational performance that is experienced with wired HART devices. The applications of this protocol may include process data monitoring, critical data monitoring (with the more stringent performance requirements), calibration, device status and diagnostic monitoring, field device troubleshooting, commissioning, and supervisory process control. These applications require that the wireless HART network 114 use a protocol which can provide fast updates when necessary, move large amounts of data when required, and support network devices which join the wireless HART network 114 only temporarily for commissioning and maintenance work.

In one embodiment, the wireless protocol supporting network devices of the wireless HART network 114 is an extension of HART, a widely accepted industry standard that maintains the simple workflow and practices of the wired environment. The wireless HART protocol may be used to establish a wireless communication standard for process applications and may further extend the application of HART communications and the benefits it provides to industry by enhancing the HART technology to support wireless process automation applications.

Referring again to FIG. 3, field or control devices 130-136 may be wireless HART devices. In other words, a field device 130, 132*a*, 132*b*, 134, or 136 may be provided as an integral unit supporting all layers of the wireless HART protocol stack. In the network 100, the field device 130 may be a wireless HART flow meter, the field device 132*b* may be wireless HART pressure sensors, and the field device 136 may a wireless HART pressure sensor.

In particular, the field device 134 may be a valve or a valve positioner including a position sensor (such as the position sensor 32 of FIG. 1), and the field device 132*a* may be a controller (such as the controller 20 of FIG. 1) that receives sensed position indications from the position sensor of the field device 134. In an embodiment, the control host 116 and/or the control host 118 each receives at least some of the position indications from the field device 134, such as via the wireless mesh communication network 114, the gateway 122, and the plant automation network 120. Additionally, a diagnostic device (such as the diagnostic device 40 of FIGS. 1 and 2) may be coupled to the field device 134 to diagnose extraneous or excess motion or vibration of the field device 134.

In some configurations, the wireless HART network 114 may include a router device 160. The router device 160 may be a network device that forwards packets from one network device to another. A network device that is acting as a router device may use internal routing tables to decide to which network device it should forward a particular packet. Stand alone routers such as the router 160 may not be required in those embodiments where all devices on the wireless HART network 114 support routing. However, it may be beneficial (e.g. to extend the network, or to save the power of a field device in the network) to add a dedicated router 160 to the network.

All devices directly connected to the wireless HART network 114 may be referred to as network devices. In particular, the wireless HART field or control devices 130-136, the routers 60, the gateway 122, and the access points 125*a*, 125*b* are, for the purposes of routing and scheduling, the network devices or the nodes of the wireless HART network 114. In order to provide a very robust and an easily expandable network, it is contemplated that all network devices may support routing and each network device may be globally identified by its HART address. Additionally, each network device may store information related to update rates, connections sessions, and device resources. In short, each network device maintains up-to-date information related to routing and scheduling. The network manager 127 communicates this information to network devices upon initialization or re-initialization of the network devices, whenever new devices join the network, or whenever the network manager detects or originates a change in topology or scheduling of the wireless HART network 114.

Referring again to FIG. 3, in a pair of network devices connected by a direct wireless connection 165, each device recognizes the other as a neighbor. Thus, network devices of the wireless HART network 114 may form a large number of connections 165. The possibility and desirability of establishing a direct wireless connection 165 between two network devices is determined by several factors such as the physical distance between the nodes, obstacles between the nodes, signal strength at each of the two nodes, etc. Further, two or more direct wireless connections 165 may form paths between nodes that cannot form a direct wireless connection 165. For example, the direct wireless connection 165 between the wireless HART hand-held device 155 and wireless HART device 136 along with the second direct wireless connection 165 between the wireless HART device 136 the router 160 form a communication path between devices 155 and 160.

Each wireless connection 165 is characterized by a large set of parameters related to the frequency of transmission, the method of access to the radio resource, etc. One of ordinary skill in the art will recognize that, in general, wireless communication protocols may operate on designated frequencies, such as the ones assigned by the Federal Communications Commission (FCC) in the United States, or in the unlicensed part of the radio spectrum (2.4 GHz). While the system and method discussed herein may be applied to a wireless network operating on any designated frequency or range of frequencies, the embodiment discussed below relates to the wireless HART network 114 operating in the unlicensed or shared part of the radio spectrum. In accordance with this embodiment, the wireless HART network 114 may be easily activated and adjusted to operate in a particular unlicensed frequency range as needed.

Figure 4:
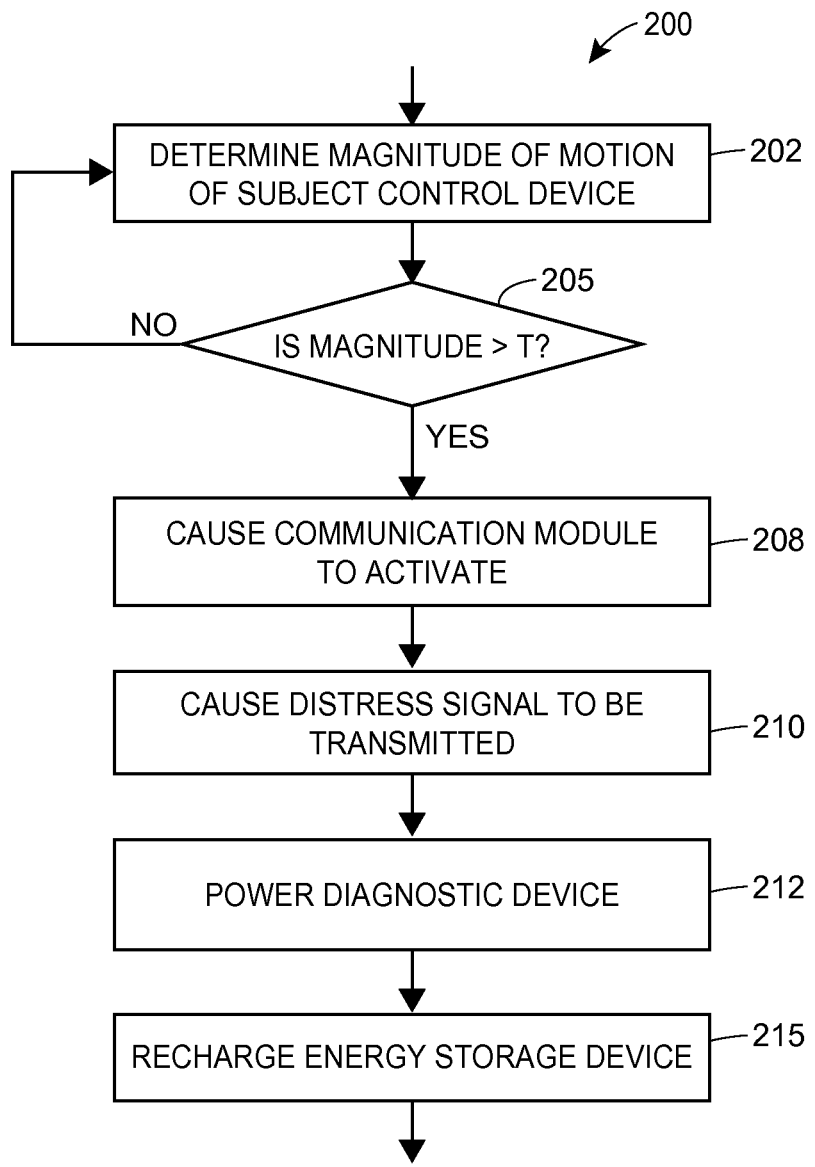
FIG. 4 is an example method of diagnosing a process control device of a process control system.

FIG. 4 is a flowchart of an example method 200 for diagnosing a control device operating in a process control system. In an embodiment, the method 200 may be performed by a diagnostic device, such as the diagnostic device 40 of FIGS. 1 and 2, or by another diagnostic device. The method 200 may operate in conjunction with the example electro-pneumatic controller 20, any number of the example configurations shown in FIGS. 1-3, and/or with other suitable controllers, control devices, and/or configurations.

The method 200 may be implemented using any combination of any of the foregoing techniques such as, for example, by using any combination of firmware, software, discrete logic and/or hardware. Further, many other methods of implementing the example operations of FIG. 4 may be employed. For example, the order of execution of the blocks may be changed, and/or one or more of the blocks described may be changed, eliminated, sub-divided, or combined. Additionally, any or all of the method 200 may be carried out sequentially and/or carried out in parallel by, for example, separate processing threads, processors, devices, discrete logic, circuits, etc. It is noted that the method 200 is described with simultaneous reference to FIGS. 1-3 for ease of discussion, however, this discussion is not limiting.

At a block 202, the method 200 may include determining a magnitude of a motion or vibration of a subject process control device. For example, a diagnostic device may be mounted on or physically coupled to a subject control device, and an accelerometer included in the diagnostic device may determine the magnitude of the motion/vibration of the control device. In an embodiment, the diagnostic device is mounted on a stem or an actuator of the control device. For instance, as shown in FIG. 1, the accelerometer 45 of the diagnostic device 40 mounted on a stem or actuator 31 of a valve 30 may determine a magnitude of motion or vibration of the valve 30.

The method 200 may further include determining whether or not the magnitude of the motion or vibration of the subject process control device is greater than a predetermined threshold or threshold value (block 205). The threshold or threshold value may be stored or coded into the accelerometer, or the threshold or threshold value may be stored or coded into a memory of the diagnostic device. In some cases, the threshold or threshold value may be modifiable or configurable, e.g., by a user. If the magnitude of the motion or vibration of the subject control device is not greater than the threshold value, then the method 200 may return to the block 202.

When the magnitude of the motion or vibration of the subject control device is determined to be greater than the threshold value (block 205), the method 200 may include causing a communication module to activate, power-on, or wake (block 208). For example, referring to FIG. 2, the communication module 58 of the diagnostic device 40 may be caused to activate when the magnitude of the motion/vibration of the control device 30 is greater than a threshold T. The communication module 58 may be activated (block 208) from a powered-off state, from a sleep state, or from some other energy-conserving state. In an embodiment, the communication module 58 may activate when the communication module 58 receives an activation signal triggered by the accelerometer 45. The activation signal may be received at the communication module 58 directly from the accelerometer 45 (reference 62), for example, or the activation signal may be received at the communication module 58 from a processor 60 included in the diagnostic device 40. For example, the processor 60 of the diagnostic device 40 may receive a signal from the accelerometer 45 when the accelerometer 45 determines that the motion/vibration of the process control device 30 is greater than the threshold T, and upon reception of said signal from the accelerometer 45, the processor 60 may transmit the activation signal to the communication module 58.

Upon activation of the communication module of the diagnostic device (block 208), the method 200 may include causing a distress signal to be transmitted from the diagnostic device (block 210) to one or more destination devices 70a-70p, e.g., by using the activated communication module. For example, referring to FIG. 2, upon its activation, the communication module 58 may transmit a distress signal 65 indicative of extraneous or excess motion or vibration of the control device 30 to one or more destination devices 70a-70p. The distress signal 65 may comport with a wireless communication protocol, such as a Zigbee, WirelessHART, or other short-range wireless protocol, or the distress signal 65 may comport with a wired communication protocol. Further, the one or more destination devices 70a-70p may include devices that are a part of or associated with the process control system 1, such as a process control system host, controller, data historian, analyzer, a local or remote user interface, external computing device, etc. The distress signal 65 may be directly transmitted from the communication module 58 to at least some of the destination devices 70a-70p. In some cases, though, the distress signal 65 may be transmitted from the communication device 58 to a paired device 68 that is communicatively disposed between the diagnostic device 40 and one or more or the destination devices 70a-70p, and the paired device 68 may transmit or forward a signal corresponding to the distress signal 65 to the one or more of the destination devices 70a-70p.

In some embodiments, the method 200 may include powering the communication module using energy from an energy storage device and/or from an energy harvester (block 212). The energy storage device and/or energy harvester may be included in the diagnostic device, or the energy storage device and/or energy harvester may be accessible to the diagnostic device. For example, referring to FIG. 2, the communication module 58 may be powered by using energy stored in the energy storage device 75 and/or by using energy harvested by the energy harvester 78. In an embodiment, causing the communication module 58 to activate (block 208) may include causing the communication module 58 to activate by using energy provided by the energy storage device 75 and/or energy harvester 78.

In embodiments in which the energy storage device is a rechargeable energy storage device, the method 200 may include recharging the energy storage device (block 215), e.g., by using any known recharging technique, such as the capturing and conversion of solar energy, battery replacement, energy recovery of local heat, vibration and/or movement of the diagnostic device and/or of the control device to which the diagnostic device is attached, a temporary connection to a plug-in source such as a DC power source, induction using a proximity charger, or any other suitable recharging means or mechanism. In the example shown in FIG. 2, the energy storage device 75 may be recharged by the energy harvester 78.

At least some of the various blocks, operations, and techniques described above may be implemented in hardware, a processor executing firmware and/or software instructions, or any combination thereof. For instance, at least portions of the diagnostic device 40 may be implemented in hardware, a processor executing firmware and/or software instructions, or any combination thereof. Additionally, at least a portion of the blocks of FIG. 4 may be implemented in hardware, a processor executing firmware and/or software instructions, or any combination thereof.

Further, when implemented utilizing a processor executing software or firmware instructions, the software or firmware instructions may be stored in any non-transitory, tangible computer readable storage medium such as a magnetic disk, an optical disk, a RAM or ROM or flash memory, tape drive, etc. The software or firmware instructions may include machine readable instructions stored on a memory or other non-transitory computer-readable storage medium that, when executed by the processor, cause the processor to perform various acts.

Still further, when implemented in hardware, the hardware may comprise one or more of discrete components, an integrated circuit, an application-specific integrated circuit (ASIC), a programmable logic device, etc.

Additionally, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A device for diagnosing a control device used in a process control system, the device comprising:
    an accelerometer responsive to a motion of the control device and configured to:
        determine that a magnitude of the motion of the control device is greater than a threshold, and
        upon determining that the magnitude of the motion of the control device is greater than the threshold, transmit an activation signal for a communication module that is included in the device and that is in one of a powered-off state, a sleep state, or another energy-conserving state;
    a communication interface; and
    the communication module, the communication module being configured to:
        (i) enter an activated state from the one of the powered-off state, the sleep state, or the another energy-conserving state upon a reception, at the communication module, of an indication of the activation signal generated by the accelerometer, and
        (ii) transmit, after activation, from the device via the communication interface, a distress signal indicative of the magnitude of the motion of the control device being greater than the threshold,
    wherein the device including the accelerometer, the communication interface, and the communication module is physically connected to the control device.

2. The device of claim 1, further comprising a connector that physically connects the device to a stem or an actuator of the control device.

3. The device of claim 1, further comprising a processor communicatively disposed between the accelerometer and the communication module, and wherein the processor is configured to:
    receive the activation signal generated by the accelerometer; and
    upon reception of the activation signal generated by the accelerometer, transmit the indication of the activation signal generated by the accelerometer to the communication module, thereby causing the communication module to activate.

4. The device of claim 1, wherein the accelerometer and the communication module are in direct communication within the device.

5. The device of claim 1, further comprising an energy harvester, and wherein the communication module activates by using energy harvested by the energy harvester.

6. The device of claim 5, further comprising an energy storage device, and wherein the energy harvested by the energy harvester is stored in the energy storage device.

7. The device of claim 1, wherein the distress signal transmitted by the communication module via the communication interface is a wireless signal conforming to the WirelessHART® protocol, a Zigbee® protocol, or a short-range wireless protocol.

8. The device of claim 1, wherein the threshold is configurable.

9. The device of claim 1, wherein the motion of the control device is a vibration of the control device.

10. The device of claim 1, wherein the control device is a valve.

11. The device of claim 1, wherein the distress signal is transmitted, by the communication module, from the device to a controller of the control device, the controller being communicatively disposed between the device and a control system host of the process control system.

12. The device of claim 1, wherein:
    the distress signal is transmitted, by the communication module, from the device to another device that is communicatively connected to and paired with the device; and
    the paired device is at least one of: (1) communicatively disposed between the device and a controller of the control device, or (2) communicatively disposed between the device and a control system host of the process control system.

13. A method of diagnosing a control device used in a process control system, the method comprising:
determining, by an accelerometer included in a diagnostic device, that a magnitude of a motion of the control device is greater than a threshold value; and
upon determining that the magnitude of the motion of the control device is greater than the threshold value, generating, by the accelerometer, an activation signal for a communication module included in the diagnostic device, the communication module being in a powered-off state, a sleep state, or another energy-conserving state, and the communication module, upon receiving an indication of the activation signal generated by the accelerometer, transitioning into an activated state and causing a wireless distress signal to be transmitted from the diagnostic device via a wireless communication interface included in the diagnostic device, the wireless distress signal indicative of the magnitude of the motion of the control device being greater than the threshold value,
wherein the diagnostic device including the accelerometer, the communication module, and the wireless communication interface is physically connected to the control device.

14. The method of claim 13, wherein determining the magnitude of the motion of the control device comprises determining a magnitude of a vibration of the control device.

15. The method of claim 13, wherein causing the wireless distress signal to be transmitted from the diagnostic device comprises causing the wireless distress signal to be transmitted from the diagnostic device to at least one of:
a controller of the control device, the controller being communicatively disposed between the diagnostic device and a control system host of the process control system; or
another device that is communicatively connected to and paired with the diagnostic device, wherein the paired device is at least one of (1) communicatively disposed between the diagnostic device and the controller, or (2) communicatively disposed between the diagnostic device and the control system host.

16. The method of claim 13, wherein causing the wireless distress signal to be transmitted from the diagnostic device comprises causing the wireless distress signal to be transmitted from the diagnostic device by using the WirelessHART® protocol, a Zigbee® protocol, or a short-range wireless protocol.

17. The method of claim 13, further comprising powering the communication module using energy stored in an energy storage device included in or proximate to the diagnostic device.

18. The method of claim 17, further comprising recharging the energy storage device by using at least one of: solar energy, a temporary connection of the energy storage device to an energy source, recovered energy from a local vibration or movement, or induction from a proximity charger.

19. The method of claim 13, wherein determining the magnitude of the motion of the control device comprises determining the magnitude of the motion of a valve.

20. The method of claim 13, wherein the threshold value is stored in the accelerometer, and wherein the method further comprises modifying the threshold value.

21. The method of claim 13, wherein causing the wireless distress signal to be transmitted from the diagnostic device comprises causing the wireless distress signal to be transmitted from the diagnostic device to a control system host of the process control system.

* * * * *